United States Patent
Wassink et al.

(10) Patent No.: US 11,553,815 B2
(45) Date of Patent: Jan. 17, 2023

(54) DOSING DEVICE, BEVERAGE DISPENSING DEVICE AND WORM BODY

(71) Applicant: J.M. DE JONG DUKE AUTOMATENFABRIEK B.V., Sliedrecht (NL)

(72) Inventors: Maarten Wassink, Capelle a/d den Ijssel (NL); Cornelis De Groen, Hendrik Ido Ambacht (NL)

(73) Assignee: J.M. DE JONG DUKE AUTOMATENFABRIEK B.V., Sliedrecht (NL)

( * ) Notice: Subject to any disclaimer, the term of this patent is extended or adjusted under 35 U.S.C. 154(b) by 894 days.

(21) Appl. No.: 16/465,890

(22) PCT Filed: Dec. 4, 2017

(86) PCT No.: PCT/NL2017/050806
§ 371 (c)(1),
(2) Date: May 31, 2019

(87) PCT Pub. No.: WO2018/101830
PCT Pub. Date: Jun. 7, 2018

(65) Prior Publication Data
US 2020/0037809 A1 Feb. 6, 2020

(30) Foreign Application Priority Data
Dec. 2, 2016 (NL) .................................. 2017911

(51) Int. Cl.
*A47J 31/40* (2006.01)
*B01F 35/71* (2022.01)
(Continued)

(52) U.S. Cl.
CPC ....... *A47J 31/404* (2013.01); *B01F 35/71775* (2022.01); *B65G 33/26* (2013.01); *B65G 65/46* (2013.01); *G01F 13/005* (2013.01)

(58) Field of Classification Search
CPC .................... G01F 13/005; B01F 35/71775
See application file for complete search history.

(56) References Cited

U.S. PATENT DOCUMENTS 3,033,249 A * 5/1962 Tamm .................. A47J 31/404
222/413
4,189,063 A 2/1979 Matthiesen
(Continued)

FOREIGN PATENT DOCUMENTS

WO 2004000085 A1 12/2003
WO 2008049222 A1 5/2008
(Continued)

OTHER PUBLICATIONS

"International Search Report", dated Feb. 19, 2018, issued in the PCT patent application No. PCT/NL2017/050806, filed Dec. 4, 2017.

*Primary Examiner* — Jason K Niesz
(74) *Attorney, Agent, or Firm* — Perry + Currier Inc.

(57) ABSTRACT

The present invention relates to a dosing device for a product in powder form, comprising a holder (10) intended to hold a first quantity of the product therein. The holder is provided with dosing means to draw off the product from the holder and move it to an outlet. The dosing means comprise a worm body (20) with a worm thread (21). In a first aspect the worm body comprises at an outer end facing toward the outflow opening at least one further worm thread (22) which runs between the first worm thread (21). In a second aspect the worm thread (21) encloses a smaller volume between suc- (Continued)

cessive turns at a base than between successive turns in a part thereof located further toward the outer end.

30 Claims, 4 Drawing Sheets

(51) Int. Cl.
*B65G 33/26* (2006.01)
*B65G 65/46* (2006.01)
*G01F 13/00* (2006.01)

(56) References Cited

U.S. PATENT DOCUMENTS

| | | | |
|---|---|---|---|
| 5,524,796 A * | 6/1996 | Hyer | B65G 33/18 |
| | | | 198/662 |
| 6,679,402 B1 | 1/2004 | D'Alayer De Costemore D'Arc | |
| 2008/0277512 A1 | 11/2008 | Vuijk | |
| 2012/0182824 A1 | 7/2012 | Zhang et al. | |
| 2012/0248143 A1 | 10/2012 | Gigandet et al. | |
| 2015/0259152 A1 | 9/2015 | Van Der Woning | |
| 2017/0000288 A1 * | 1/2017 | Dubief | A47J 31/404 |

FOREIGN PATENT DOCUMENTS

| WO | 2012/134295 A1 | 10/2012 |
|---|---|---|
| WO | 2016/091830 A1 | 6/2016 |

* cited by examiner

DOSING DEVICE, BEVERAGE DISPENSING DEVICE AND WORM BODY

CROSS-REFERENCE TO RELATED APPLICATIONS

This application is a continuation under 35 U.S.C. § 371 of International Application No. PCT/NL2017/050806 filed on Dec. 4, 2017, which claims priority to Dutch Application Ser. No. 2017911 filed on Dec. 2, 2016, which is hereby incorporated by reference herein in its entirety.

The present invention relates to a dosing device for a product in powder form, comprising a holder intended to hold a first quantity of the product therein, which holder is provided on a dispensing side with dosing means which are able and configured to draw off a second smaller quantity of product from the holder and move it to an outlet of the device, wherein the dosing means comprise a worm body comprising a spindle, on a periphery of which extends a worm thread running at least substantially in a spiral over the periphery of the spindle, wherein the worm thread opens toward the dispensing side of the holder in order to receive the powder and is able and configured, when rotated, to move the powder out of the holder to the outlet and to dispense it via an outflow opening of the outlet, and wherein the worm body is at least connectable to a mechanical drive which is able and configured to impart a rotation about the rotation axis to the worm body. The invention relates particularly here to a dosing device for application in a device for preparing a beverage, in particular a hot beverage such as coffee, espresso, cocoa and tea. The invention therefore also relates to a beverage dispensing device.

Beverage dispensing devices, or coffee machines as they are also simply referred to, are applied on large scale to prepare a fresh hot beverage such as coffee, espresso, chocolate milk (cocoa) and/or tea to order and in accordance with the taste of the user. It is important here that not only the main ingredient, but also possible additives such as powdered milk and sugar, are dosed precisely in order to thereby satisfy the taste of the user as well as to maintain the economic efficiency of the device. The known beverage dispensing device comprises for this purpose a dosing device of the type described in the preamble for each of the components in powder form to be dosed. It is noted here that the term powder should be interpreted broadly within the context of the invention, and the device can therefore be utilized for diverse solid fluids. The invention is suitable as such for very finely powdered products, such as for instance powdered milk, topping and cocoa, but also for coarser granular products such as sugar and freeze-dried coffee, tea and chocolate milk, and even for beans such as coffee beans.

An existing beverage dispensing device often comprises a series of usually transparent box-like holders adjacently of each other with a relatively small width in proportion to their height and depth, for instance for respectively (powdered) milk, sugar and cocoa. Situated at the bottom of or below each of these holders is a worm body of dosing means which extends in the depth direction and is in direct contact with the product of the holder. Each of the worm bodies is individually driven from the device, for instance by an electric motor, whereby a quantity of product is thus forced by the worm thread in the direction of the outlet and delivered to the outflow opening. A number of revolutions or operating duration here defines the quantity of product which is thus delivered to the beverage.

A problem which occurs in the known device is that, following such a dosing of a product and as a result of for instance accidental bumping against the machine, a small quantity of product still left at the front of the outflow opening is also unintentionally delivered. This is referred to simply as "after-flow" of the product. Although this involves a relatively small quantity per delivery, the taste of the final beverage is nevertheless affected hereby in unintended and uncontrolled manner, this inevitably reducing the economic efficiency of the device.

It is also found in practice that in the depth direction of the worm body the product is not always drawn off to the same extent along the whole length. This is because more takeoff takes place at the base of the worm body than at a front side. The holder is hereby emptied sooner close to the base of the worm body than at a front side, whereby at the front side the holder appears to be fuller than is in fact the case, and the set dosing is no longer guaranteed.

The present invention has for its object, among others, to provide a dosing device for a powder which can be applied in a beverage dispensing device and which obviates at least one of these drawbacks to at least significant extent.

In order to achieve the stated object a dosing device of the type described in the preamble has the feature according to a first aspect of the invention that the worm body comprises at least at an outer end facing toward the outflow opening at least one further worm thread extending from the periphery of the spindle, that the at least one further worm thread runs at least substantially in a further spiral between the first worm thread over the periphery of the spindle, and that the drive is able and configured to impart a controlled, first optionally whole number of rotations to the worm body in a first rotation direction followed by a controlled, second optionally whole number of rotations in a second opposite direction, which second number is smaller than the first number. Because of the presence of the at least one extra worm thread on the outer end the worm body has an extra contact surface here, and thereby more grip on the product in powder form still left in the outlet following a dosing. By rotating the worm body back a small second number of turns in opposite direction after the dosing, this quantity of product can be forced back out of the outlet particularly effectively so that the chance of "after-flow" of the product is significantly reduced.

In a preferred embodiment the dosing device according to the invention has the feature that the holder comprises on the delivery side a delivery opening through which the product is delivered to a first part of the worm body, that the outer end facing toward the outflow opening extends from a second part of the worm body, which second part is located wholly outside the delivery opening, and that the at least one further worm thread is located at least substantially solely in the second part of the worm body outside the delivery opening. Because the further worm thread is thus located solely in the part of the worm body oriented toward the outlet, only there is more grip exerted on the product and thereby an increased transporting capability achieved relative to the first part. Hereby achieved is that the product in and close to the outlet is moved back particularly effectively during reverse rotation of the spindle while in the first part of the worm body there occurs only a small measure of compaction of the powder. The powder-like character and behaviour of the product hereby remains wholly preserved in this first part.

In order to enhance engagement of the last vestiges of product on the product in the outlet both at the top and bottom during reverse rotation of the worm body, a preferred embodiment of the dosing device according to the invention has the feature that the at least one further worm thread runs out of phase relative to the first worm thread, and particularly comprises a second worm thread which runs at least substantially opposite the first worm thread. This means that the at least one extra worm thread lies rotated relative to the first worm thread, and in particular that the at least one worm thread comprises a second worm thread which, rotated through 180°, lies opposite the first worm thread on the spindle. In a section transversely of the rotation axis of the spindle the worm body thus has a similar grip on the product in different directions.

A further preferred embodiment of the dosing device is characterized according to the invention in that the worm body extends with the outer end facing toward the outflow opening at least substantially as far as the outflow opening. The worm body thus retains contact with the product up to or even into or beyond the outflow opening, so that particularly the part thereof situated just behind the outflow opening which is most critical in terms of "after-flow" is removed during a rotation of the worm body in opposite direction following dosing.

In a particular embodiment the dosing device according to the invention has the feature that the outlet comprises adjacently of the outflow opening an upstand with an inclination relative to a direction of transport of the worm body and that the worm body extends at least substantially as far as the upstand and has a pointed form at the outer end with an apex angle which at least substantially matches the upstand. The upstand provides an edge which also prevents "after-flow" of product. The worm body forces the product over this edge during dosing but, conversely, during the opposite rotation following dosing provides for an empty space behind the edge which then provides space for a product which is still possibly present above the edge and which will drop therein.

For the purpose of practical removability of the dosing device from a beverage dispensing device, a particular embodiment of the dosing device has the feature according to the invention that the worm body extends on a base from a rotation body provided for rotation about a rotation axis in a wall of the holder, wherein the rotation body is provided externally of the holder with coupling means for coupling to a mechanical drive, in particular for coupling to an output shaft of an electric motor. The coupling here advantageously comprises an insertion cavity in combination with an insertion body fittingly receivable in the insertion cavity which both extend from the drive and the rotation body so that the coupling can be easily effected by inserting the insertion body into the insertion cavity during placing of the dosing device.

In order to enhance fluidity of the product at the bottom of the holder and prevent bridge formation, a further particular embodiment of the dosing device according to the invention has the feature that the worm body with the first worm thread is in engaging transmission with a toothing on a periphery of a wheel which is suspended on the outlet side in the holder for rotation about a rotation axis oriented substantially transversely of a rotation axis of the worm body. A supply of the product in the holder is thus set into movement in the bottom of the holder by the wheel during each dosing and thereby kept fluid. The wheel is driven here by the worm body.

In a second aspect of the invention a dosing device of the type described in the preamble has the feature according to the invention that the worm thread comprises a number of turns from a base to an outer end facing toward the outlet, wherein the worm thread encloses a smaller volume between successive turns at the base than between successive turns in a part thereof located further toward the outer end. This smaller volume enclosed by the worm thread at the base of the worm body thus at least partially compensates for the naturally greater product takeoff such as is found in the known dosing device. This enhances uniform takeoff of the product from the product holder along a full length of the worm body.

A preferred embodiment of the dosing device has the feature according to the invention that the worm thread encloses from the base to the outer end a gradually larger volume between successive turns over at least a part of a length thereof. The volume enclosed between the turns can become gradually larger here in stepwise or continuous manner so as to thus stepwise or continuously remove increasingly more volume from the holder over the relevant part of the worm body.

The volume enclosed between successive turns of the worm thread can be varied in diverse ways. An embodiment of the dosing device according to the invention has for this purpose, in a non-limitative recital, one or more of the following features:

that the worm thread is wider at the base than in the part located further toward the outer end, and in particular from the base to the outer end becomes gradually narrower between successive turns over at least a part of a length thereof;

that the worm thread is lower at the base than in the part located further toward the outer end, and in particular from the base to the outer end becomes gradually higher between successive turns over at least a part of a length thereof;

that the worm thread has a smaller pitch at the base than in the part located further toward the outer end, and in particular from the base to the outer end has a gradually greater pitch between successive turns over at least a part of a length thereof;

that the worm thread is more rounded at the base than in the part located further toward the outer end, and in particular from the base to the outer end is gradually less rounded between successive turns of the worm thread over at least a part of a length thereof;

that the spindle is thicker at the base than in the part located further toward the outer end, and in particular from the base to the outer end becomes gradually thinner between successive turns of the worm thread over at least a part of a length thereof; and/or that the worm body has a smaller diameter at the base than in the part located further toward the outer end, and in particular from the base to the outer end acquires a gradually larger diameter between successive turns over at least a part of a length thereof.

The invention also relates to a beverage dispensing device comprising preparing means which are able and configured to receive at least one product in powder form from a dosing device and to mix it with a liquid in order to prepare a beverage, and is characterized here by at least one dosing device according to the invention as specified above. The invention also relates to a worm body of the type as is or can be applied in the dosing device according to the invention as specified above.

The invention will be further elucidated hereinbelow on the basis of an exemplary embodiment and an accompanying drawing. In the drawing.

The figures are otherwise schematic and not always drawn to the same scale. Some dimensions in particular may be exaggerated to greater or lesser extent for the sake of clarity. Corresponding parts are generally designated in the figures with the same reference numeral.

Figure 1:
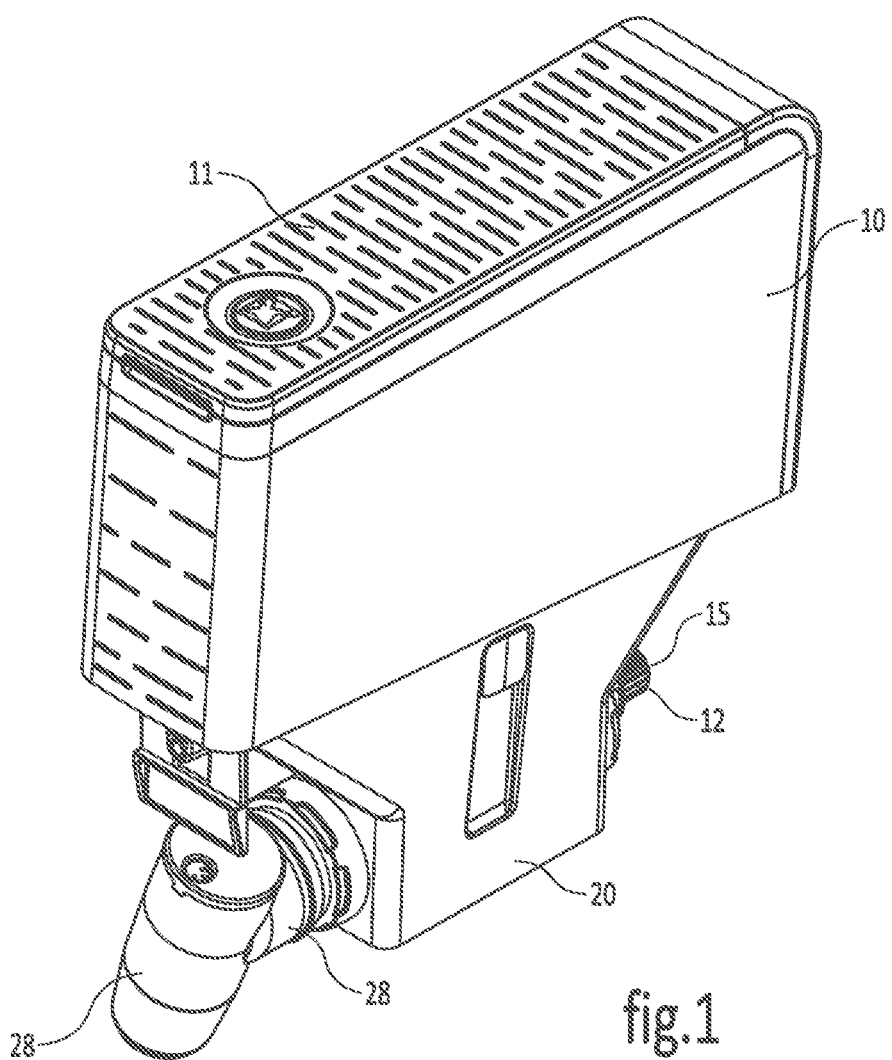
FIG. 1 is a perspective view of an exemplary embodiment of a dosing device according to the invention.

Shown in FIG. 1 is a dosing device such as can be applied for instance in a beverage dispensing device (also referred to as coffee machine, not shown). The dosing device comprises a box-like holder 10 of a transparent plastic on which a cover 11 rests in releasable manner. The holder typically has a volume of 250 to 1000 ml and provides space for a supply in the order of 250 to 1500 grams of a product in powder form such as bouillon powder, cocoa, sugar, powdered milk or topping, from which, optionally together with a main ingredient such as coffee or tea, a hot beverage as desired by the user is prepared by the beverage dispensing device. The beverage dispensing device comprises a device of the type shown here for each of the powder components to be dosed. A predetermined quantity of the relevant product is dosed herefrom in accordance with the beverage to be prepared.

Figure 2:
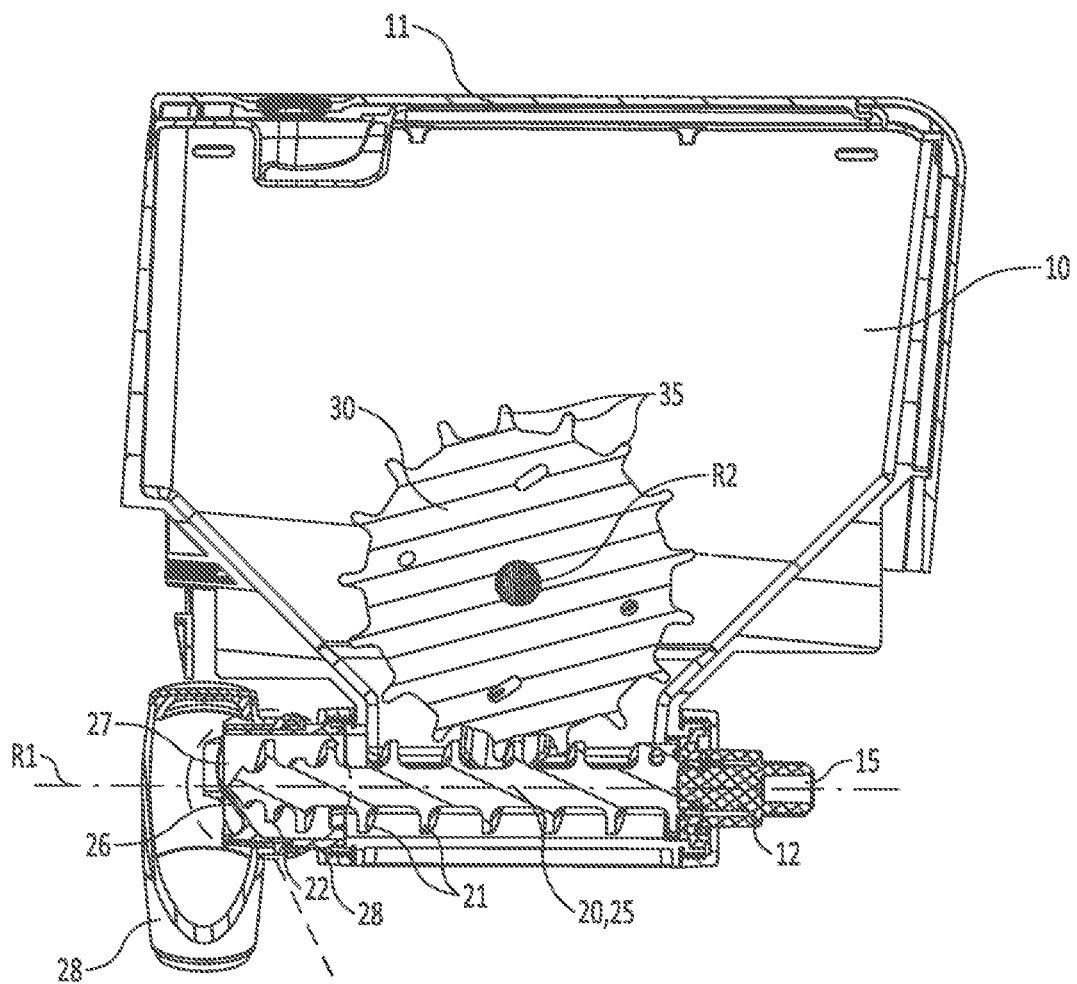
FIG. 2 shows a cross-section of the device of FIG. 1.
Figure 3:
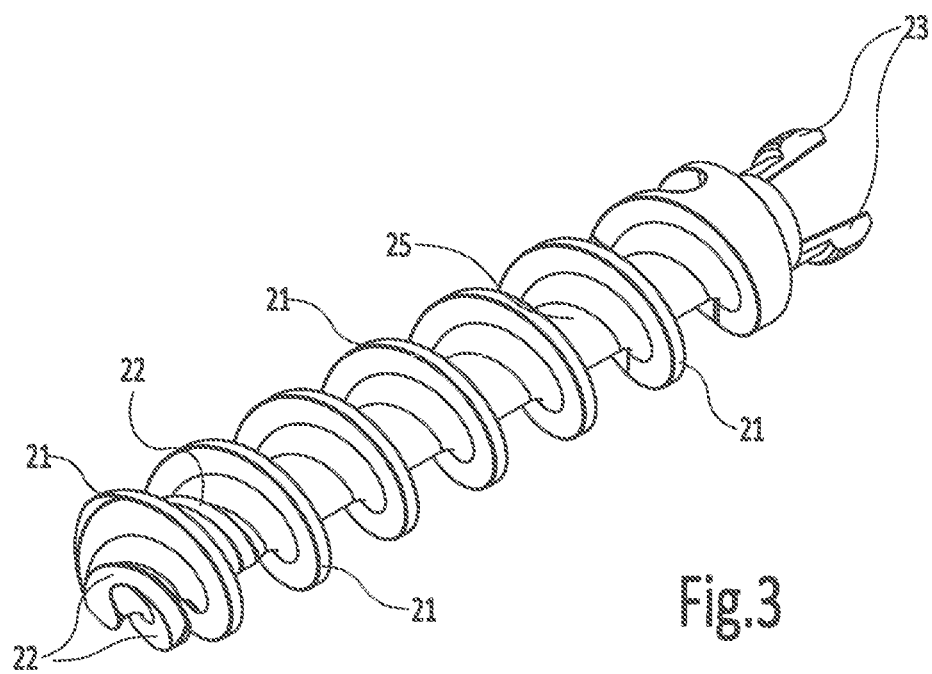
FIG. 3 is a perspective view of a worm body for the dosing device of FIG. 1.
Figure 4:
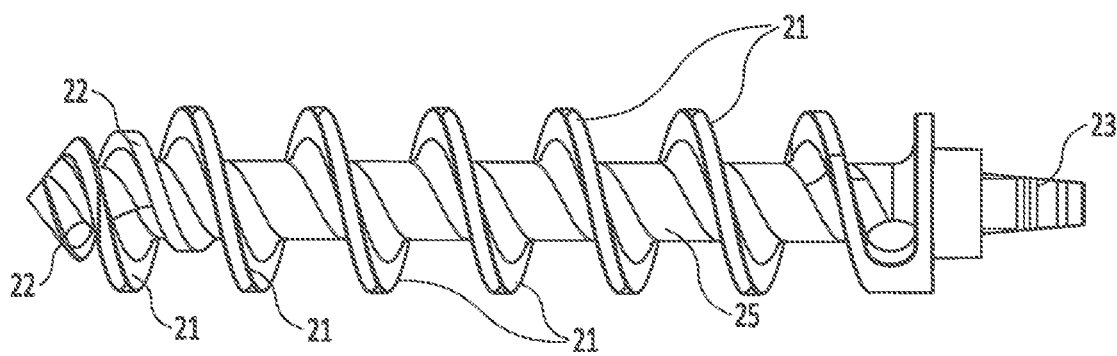
FIG. 4 is a side view of the worm body of FIG. 3.
Figure 5:
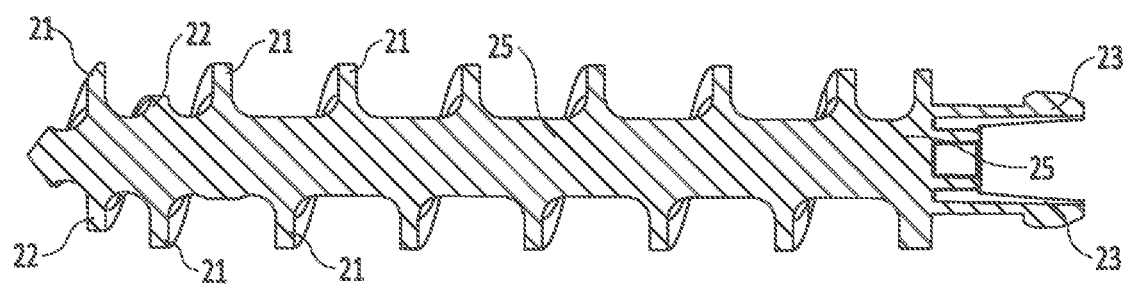
FIG. 5 shows a cross-section of the worm body of FIG. 3.

For this purpose the dosing device comprises at the bottom on a dispensing side dosing means in the form of a worm body 20, see also FIG. 2, on which a column of the relevant product rests and which extends for rotation about a rotation axis R1 from a rotation body 12 which is received for rotation about the axis R1 in the wall of the holder. Worm body 20 comprises a spindle 25 on which a worm thread 21 with a number of turns runs substantially in a spiral. Worm body 20 can be manufactured integrally from a suitable plastic, for instance by injection moulding. At a base the worm body comprises a set of resilient fingers 23, see FIGS. 3 to 5, which drop into a corresponding set of cavities of rotation body 12 and form a snap connection with a wall thereof.

Rotation body 12 comprises externally an insertion cavity 15 in which an insertion body extending from the beverage dispensing device can be received. This insertion body comprises in practice an output shaft of drive means, such as an electric motor which extends horizontally from a rear wall of a product space in the beverage dispensing device. When the dosing device is placed in the product space this shaft drops into insertion cavity 15. An inner wall of cavity 15 and an outer wall of the shaft have a complementary profile, whereby the output shaft of the drive and the rotation body are thus in mutual engagement and a rotation of the rotation body with worm body 20 thereon can be realized by the drive.

Figure 2A:
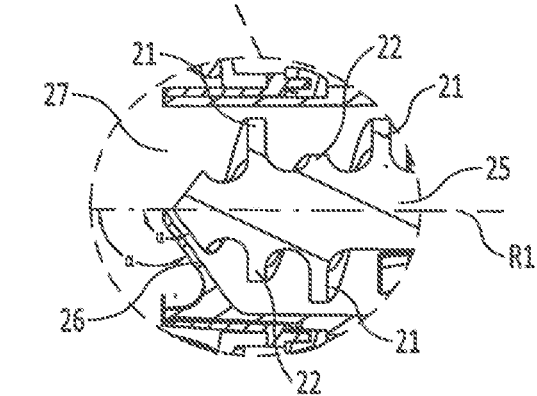
FIG. 2A is a detail drawing of a part of the device of FIG. 2.

Worm thread 21 is open toward the product in product holder 10, whereby the space between the turns will be filled with the product. Through rotation of worm body 20 about rotation axis R1 the worm thread 21 will entrain and force a quantity of product to an outlet 28 of the dosing device located outside product space 10. The product is there released to a dispensing opening 27 and the product drops via the outlet, optionally via an intermediate conduit, into the other components for the beverage to be prepared. FIG. 2A shows this part of the dosing device with the outflow opening in further detail. The drive means are controlled here by a control device of the beverage machine, whereby a precisely determined number of turns (revolutions) is imparted to worm body 20 so that an accurate dosing of the relevant product thus takes place in accordance with a preset of the device or a preselection of the user. The control can here comprise a set number of steps of a stepping motor or a time setting for which the worm body is driven.

Although there is thus control over the quantity of the product to be dosed, there is the danger that, following a dosing, a small quantity of product that was situated just at the front of dispensing opening 27 will fall out of the opening, for instance because the device is bumped. In order to prevent this "after-flow" of the product the dosing device comprises on the edge of dispensing opening 27 an upstand 26 which already holds back a lower part of this remaining quantity but over which the product can be forced by the worm body so that it is delivered. This upstand 26 has an inclination here at an angle relative to rotation axis R1.

In order to further counter "after-flow" of the product the worm body 20 according to this exemplary embodiment runs on into outlet 28, precisely as far as upstand 26. Worm body 20 has a pointed form at this outer end and is chamfered for this purpose to the same angle as the inclination of the upstand so that it can fit closely thereto. The thus lengthened worm body 20 moreover carries on this end facing toward dispensing opening 27 a second worm thread 22 between the turns of first worm thread 21, see also FIGS. 3 to 5 in which worm body 20 is shown on its own. Second worm thread 22 lies here out of phase, that is rotated, relative to first worm thread 21, whereby a turn thereof, as seen in a cross-section transversely of rotation axis R1, will always extend at an angle other than a turn of first worm thread 21 from the periphery of spindle 25 of the worm body. The worm body thus has grip on the product as far as the upstand and second worm thread 22 here provides an enlarged contact surface, and thereby more contact with the product. Second worm thread 22 extends here only in an area of the worm body located outside dispensing opening 27 of the holder, so that no additional compaction occurs in the area of the worm body which receives the product directly from the holder.

In this example second worm thread 22 is in counter-phase to first worm thread 21, i.e. rotated 180°, whereby the turns of second worm thread 22 are always located opposite those of first worm thread 21 as seen transversely of rotation axis R1. There will hereby always be contact with the part of a quantity of product in the outlet situated above the upstand, either due to a turn of first worm thread 21 or due to a turn of second worm thread 22.

The drive of worm body 20 is programmed such that, following a dosing of the product through a controlled rotation of the worm body over a first optionally whole number of rotations, the worm body is set into a reverse rotation over a second optionally whole number of rotations significantly smaller than the first number of rotations. The product is hereby pulled back out of outlet 28 so that particularly the part thereof located at the edge of opening 27 can no longer escape in unintended and uncontrolled manner from the dosing device. Just as the primary rotation for the purpose of dosing, this reverse rotation of the worm body can also be controlled according to time or the number of revolutions of the drive motor.

Also important for an accurate and controlled dosing of the product is a good and uniform flow of the product from the holder to the worm wheel. In order to counteract bridge forming of the product at the bottom of holder 10 on the dispensing side an agitator wheel 35 is suspended here in holder 10 for rotation about a rotation axis R2 placed transversely of rotation axis R1 of the worm wheel. Agitator wheel 30 carries on its periphery a toothing 35 which on the one hand is in transmission engagement with first worm thread 21 of the worm wheel, and will thus be set into rotation thereby, and on the other provides grip on the product at the bottom of holder 10, whereby this will remain fluid and bridge formation is counteracted.

Figure 6:
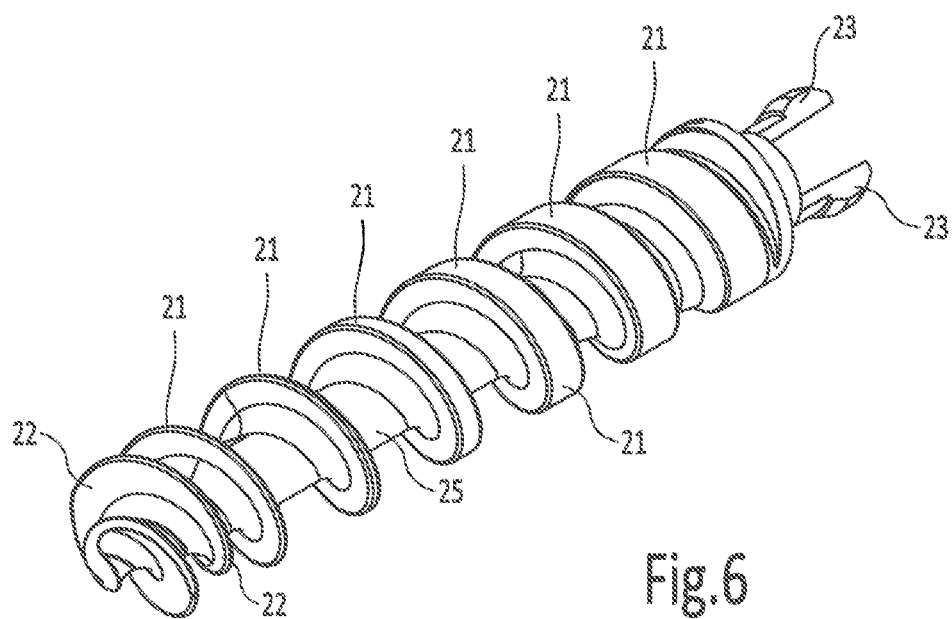
FIG. 6 is a perspective view of an alternative worm body for the dosing device of FIG. 1.

In addition, it is found in practice that the transporting capability of worm wheel 20 is greater at a base thereof than in a part located further toward the outer end. More product is hereby removed from the holder at the base than at this part located further away, so that the holder may already be empty on a rear side while a column of product is still present at a front side. Not only does this provide a distorted view of an actual supply situation in the holder from the front side, a correct dosing up to the end of the holder can therefore also no longer be ensured. Shown in FIGS. 6 to 8 is a worm body which can be applied in the dosing device in order to counteract this.

Other than the worm wheel shown in the foregoing figures, first worm thread 21 of worm body 20 encloses a smaller volume between successive turns at the base than a part located further toward the outer end. This is achieved on the one hand in that the turns take a thicker form at the base and gradually become thinner in stepwise manner toward the outer end. When the pitch of worm thread 21 remains the same, an intermediate space between the turns hereby gradually acquires a greater width w1 . . . w5, and thereby more volume, see FIG. 8.

Figure 7:
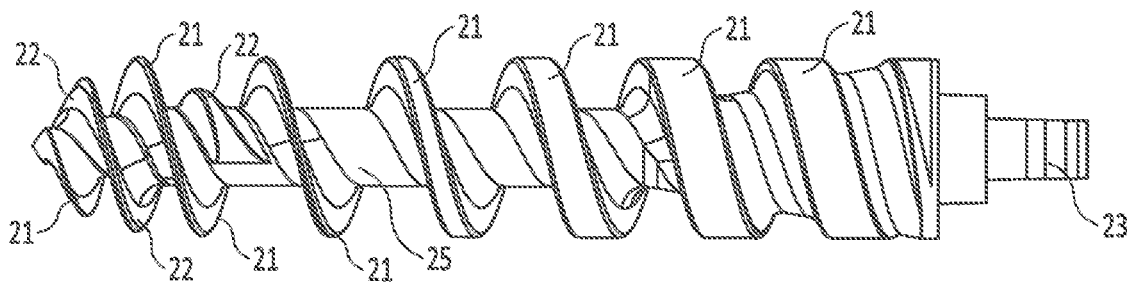
FIG. 7 is a side view of the worm body of FIG. 6.
Figure 8:
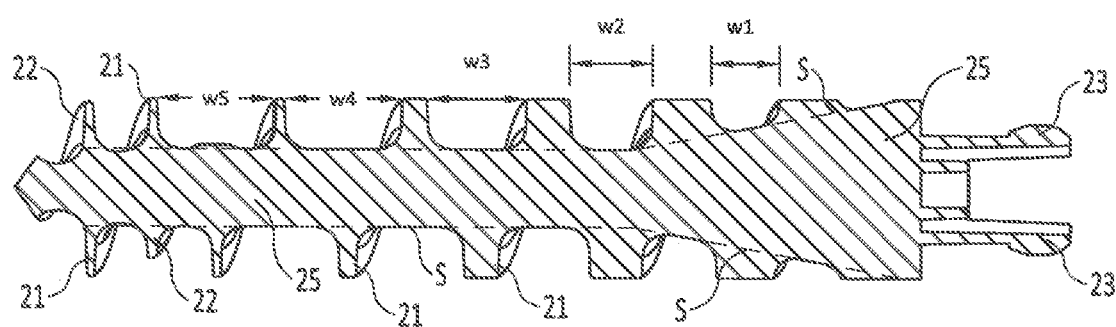
FIG. 8 shows a cross-section of the worm body of FIG. 6.

The shown worm body moreover has a greater spindle diameter at the base, this being shown particularly clearly in FIGS. 7 and 8 and being indicated with a broken line S in FIG. 8. This has the result that the intermediate space between the turns of worm thread 21 will have a smaller depth, and so also a smaller enclosed volume. All in all, a take-up capacity of the worm body is thus reduced at the base relative to a part located further toward the outer end so as to thereby compensate at least partially for the naturally present tendency of the worm wheel to take up more product from the holder at the base than further away.

In the exemplary embodiment of FIGS. 6 to 8 use is in addition made of a worm wheel with a lengthened spindle with a pointed end which extends up to the edge of the outlet and which carries an extra worm thread 22, both in order to counteract "after-flow" of the product from the outlet as described with reference to the foregoing example. If desired, one or both of these additional provisions can also be omitted if there is no need for them.

Although the invention has been further elucidated above with reference to only several exemplary embodiments, it will be apparent that the invention is by no means limited thereto. On the contrary, many variations and embodiments are still possible within the scope of the invention for a person with ordinary skill in the art.

The invention claimed is:

1. Dosing device for a product in powder form, comprising a holder intended to hold a first quantity of the product therein, which holder is provided on a dispensing side with dosing means which are able and configured to draw off a second smaller quantity of product from the holder and move it to an outlet of the device, wherein the dosing means comprise a worm body comprising a spindle, on a periphery of which extends a worm thread running at least substantially in a spiral over the periphery of the spindle, wherein the worm thread opens toward the dispensing side of the holder in order to receive the powder and is able and configured, when rotated, to move the powder out of the holder to the outlet and to dispense it via an outflow opening of the outlet, and wherein the worm body is at least connectable to a mechanical drive which is able and configured to impart a rotation about the rotation axis to the worm body, characterized in that the worm body comprises at least at an outer end facing toward the outflow opening at least one further worm thread extending from the periphery of the spindle, that the at least one further worm thread runs at least substantially in a further spiral between the first worm thread over the periphery of the spindle, and that the drive is able and configured to impart a controlled, first number of rotations to the worm body in a first rotation direction followed by a controlled, second number of rotations in a second opposite direction, which second number is smaller than the first number.

2. Worm body of the type as applied in the dosing device as claimed in claim 1.

3. Dosing device according to claim 1, characterized in that the outlet comprises adjacently of the outflow opening an upstand with an inclination relative to a direction of transport of the worm body and that the worm body extends at least substantially as far as the upstand and has a pointed form at the outer end with an apex angle which at least substantially matches the upstand.

4. Dosing device according to claim 3, characterized in that the worm body extends on a base from a rotation body provided for rotation about a rotation axis in a wall of the holder, wherein the rotation body is provided externally of the holder with coupling means for coupling to a mechanical drive, in particular for coupling to an output shaft of an electric motor.

5. Dosing device according to claim 1, characterized in that the worm body extends on a base from a rotation body provided for rotation about a rotation axis in a wall of the holder, wherein the rotation body is provided externally of the holder with coupling means for coupling to a mechanical drive, in particular for coupling to an output shaft of an electric motor.

6. Dosing device according to claim 5, characterized in that the worm body with the first worm thread is in engaging transmission with a toothing on a periphery of a wheel which is suspended on the outlet side in the holder for rotation about a rotation axis oriented substantially transversely of a rotation axis of the worm body.

7. Beverage dispensing device comprising preparing means which are able and configured to receive at least one product in powder form from a dosing device and to mix it with a liquid in order to prepare a beverage, characterized by at least one dosing device as claimed in claim 1.

8. Beverage dispensing device as claimed in claim 7, characterized in that the at least one dosing device comprises a product from a group comprising chocolate powder, cocoa, powdered milk, sugar and coffee powder.

9. Dosing device according to claim 1, characterized in that the worm body with the first worm thread is in engaging transmission with a toothing on a periphery of a wheel which is suspended on the outlet side in the holder for rotation about a rotation axis oriented substantially transversely of a rotation axis of the worm body.

10. Worm body of the type as applied in the dosing device as claimed in claim 9.

11. Beverage dispensing device comprising preparing means which are able and configured to receive at least one product in powder form from a dosing device and to mix it with a liquid in order to prepare a beverage, characterized by at least one dosing device as claimed in claim 9.

12. Dosing device as claimed in claim 9, characterized in that the worm thread has a smaller pitch at the base than in the part located further toward the outer end, and in particular from the base to the outer end has a gradually greater pitch between successive turns over at least a part of a length thereof.

13. Dosing device as claimed in claim 12, characterized in that the worm thread is more rounded at the base than in the part located further toward the outer end, and in particular from the base to the outer end is gradually less rounded between successive turns of the worm thread over at least a part of a length thereof.

14. Dosing device as claimed in claim 13, characterized in that the spindle is thicker at the base than in the part located further toward the outer end, and in particular from the base to the outer end becomes gradually thinner between successive turns of the worm thread over at least a part of a length thereof.

15. Dosing device as claimed in claim 14, characterized in that the worm body has a smaller diameter at the base than in the part located further toward the outer end, and in particular from the base to the outer end acquires a gradually larger diameter between successive turns over at least a part of a length thereof.

16. Worm body of the type as applied in the dosing device as claimed in claim 15.

17. Beverage dispensing device comprising preparing means which are able and configured to receive at least one product in powder form from a dosing device and to mix it with a liquid in order to prepare a beverage, characterized by at least one dosing device as claimed in claim 15.

18. Dosing device for a product in powder form, comprising a holder intended to hold a first quantity of the product therein, which holder is provided on a dispensing side with dosing means which are able and configured to draw off a second smaller quantity of product from the holder and move it to an outlet of the device, wherein the dosing means comprise a worm body comprising a spindle, on a periphery of which extends a worm thread running at least substantially in a spiral over the periphery of the spindle, wherein the worm thread opens toward the dispensing side of the holder in order to receive the powder and is able and configured, when rotated, to move the powder out of the holder to the outlet and to dispense it via an outflow opening of the outlet, and wherein the worm body is at least connectable to a mechanical drive which is able and configured to impart a rotation about the rotation axis to the worm body, characterized in that the worm body comprises at least at an outer end facing toward the outflow opening at least one further worm thread extending from the periphery of the spindle, that the at least one further worm thread runs at least substantially in a further spiral between the first worm thread over the periphery of the spindle, and that the drive is able and configured to impart a controlled, first number of rotations to the worm body in a first rotation direction followed by a controlled, second number of rotations in a second opposite direction, which second number is smaller than the first number, characterized in that the holder comprises on the delivery side a delivery opening through which the product is delivered to a first part of the worm body, that the outer end facing toward the outflow opening extends from a second part of the worm body, which second part is located wholly outside the delivery opening, and that the at least one further worm thread is located at least substantially solely in the second part of the worm body outside the delivery opening.

19. Dosing device as claimed in claim 18, characterized in that the at least one further worm thread runs out of phase relative to the first worm thread, and particularly comprises a second worm thread which runs at least substantially opposite the first worm thread.

20. Dosing device as claimed in claim 19, characterized in that the worm body extends with the outer end facing toward the outflow opening at least substantially as far as the outflow opening.

21. Dosing device according to claim 20, characterized in that the outlet comprises adjacently of the outflow opening an upstand with an inclination relative to a direction of transport of the worm body and that the worm body extends at least substantially as far as the upstand and has a pointed form at the outer end with an apex angle which at least substantially matches the upstand.

22. Dosing device for a product in powder form, comprising a holder intended to hold a first quantity of the product therein, which holder is provided on a dispensing side with dosing means which are able and configured to draw off a second smaller quantity of product from the holder and move it to an outlet of the device, wherein the dosing means comprise a worm body comprising a spindle, on a periphery of which extends a worm thread running at least substantially in a spiral over the periphery of the spindle, wherein the worm thread opens toward the dispensing side of the holder in order to receive the powder and is able and configured, when rotated, to move the powder out of the holder to the outlet and to dispense it beyond an outflow opening of the outlet, and wherein the worm body is at least connectable to a mechanical drive which is able and configured to impart a rotation about the rotation axis to the worm body, characterized in that the worm thread comprises a number of turns from a base to an outer end facing toward the outlet, wherein the worm thread encloses a smaller volume between successive turns at the base than between successive turns in a part thereof located further toward the outer end.

23. Dosing device as claimed in claim 22, characterized in that the worm thread has a smaller pitch at the base than in the part located further toward the outer end, and in particular from the base to the outer end has a gradually greater pitch between successive turns over at least a part of a length thereof.

24. Worm body of the type as applied in the dosing device as claimed in claim 22.

25. Beverage dispensing device comprising preparing means which are able and configured to receive at least one product in powder form from a dosing device and to mix it with a liquid in order to prepare a beverage, characterized by at least one dosing device as claimed in claim 22.

26. Dosing device as claimed in claim 22, characterized in that the worm thread encloses from the base to the outer end a gradually larger volume between successive turns over at least a part of a length thereof.

27. Dosing device as claimed in claim 26, characterized in that the worm thread is wider at the base than in the part located further toward the outer end, and in particular from the base to the outer end becomes gradually narrower between successive turns over at least a part of a length thereof.

28. Dosing device as claimed in claim 27, characterized in that the worm thread is lower at the base than in the part located further toward the outer end, and in particular from the base to the outer end becomes gradually higher between successive turns over at least a part of a length thereof.

29. Dosing device as claimed in claim 27, characterized in that the worm thread has a smaller pitch at the base than in the part located further toward the outer end, and in particular from the base to the outer end has a gradually greater pitch between successive turns over at least a part of a length thereof.

30. Dosing device for a product in powder form, comprising a holder intended to hold a first quantity of the product therein, which holder is provided on a dispensing side with dosing means which are able and configured to draw off a second smaller quantity of product from the holder and move it to an outlet of the device, wherein the dosing means comprise a worm body comprising a spindle, on a periphery of which extends a worm thread running at least substantially in a spiral over the periphery of the spindle, wherein the worm thread opens toward the dispensing side of the holder in order to receive the powder and is able and configured, when rotated, to move the powder out of the holder to the outlet and to dispense it beyond an outflow opening of the outlet, and wherein the worm body is at least connectable to a mechanical drive which is able and configured to impart a rotation about the rotation axis to the worm body, characterized in that the worm thread comprises a number of turns from a base to an outer end facing toward the outlet, wherein the worm thread encloses a smaller volume between successive turns at the base than between successive turns in a part thereof located further toward the outer end, characterized in that the holder comprises on the delivery side a delivery opening through which the product is delivered to a first part of the worm body, that the outer end facing toward the outflow opening extends from a second part of the worm body, which second part is located wholly outside the delivery opening, and that the at least one further worm thread is located at least substantially solely in the second part of the worm body outside the delivery opening.

* * * * *